(Model.)
10 Sheets—Sheet 1.
A. T. L. DAVIS.
KNITTING MACHINE.
No. 326,854.  Patented Sept. 22, 1885.
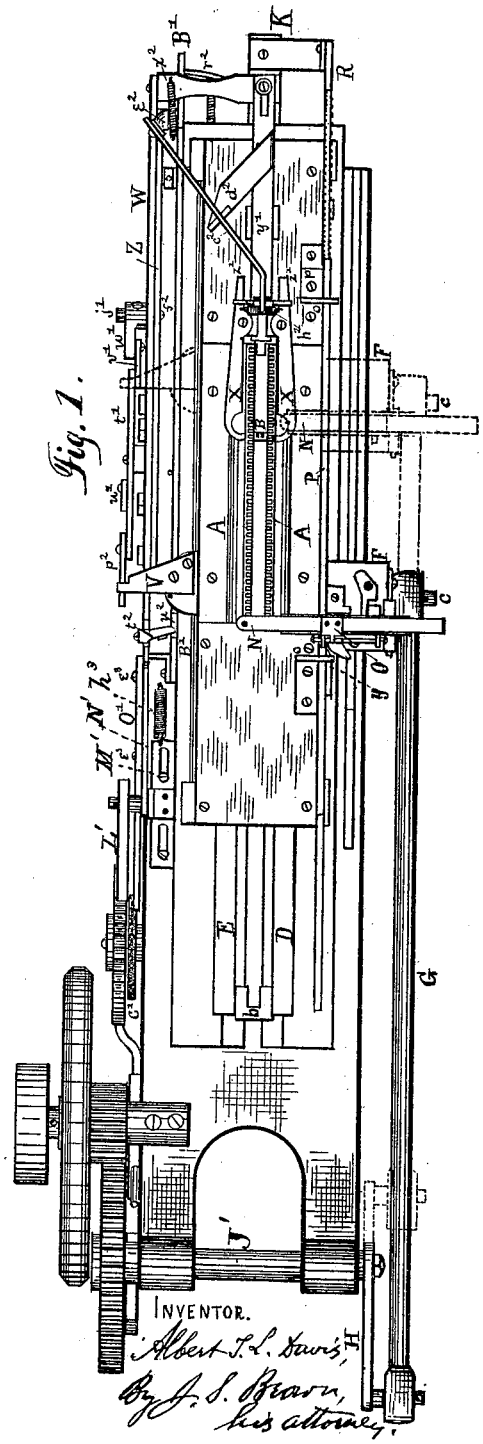
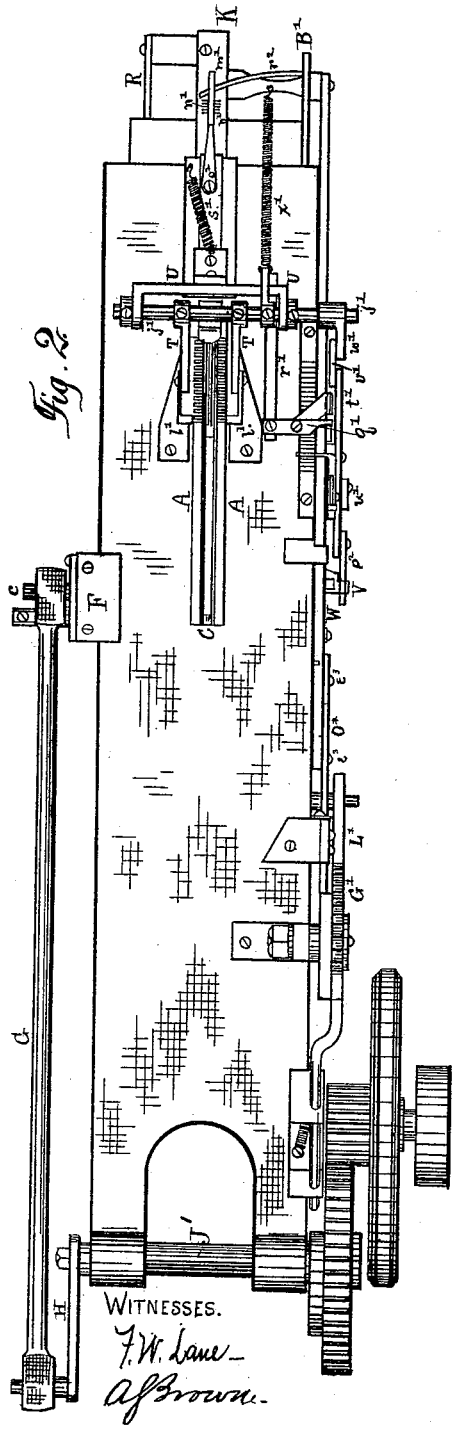
WITNESSES.
F. W. Lane
A. S. Brown
INVENTOR.
Albert T. L. Davis,
By J. S. Brown,
his attorney.

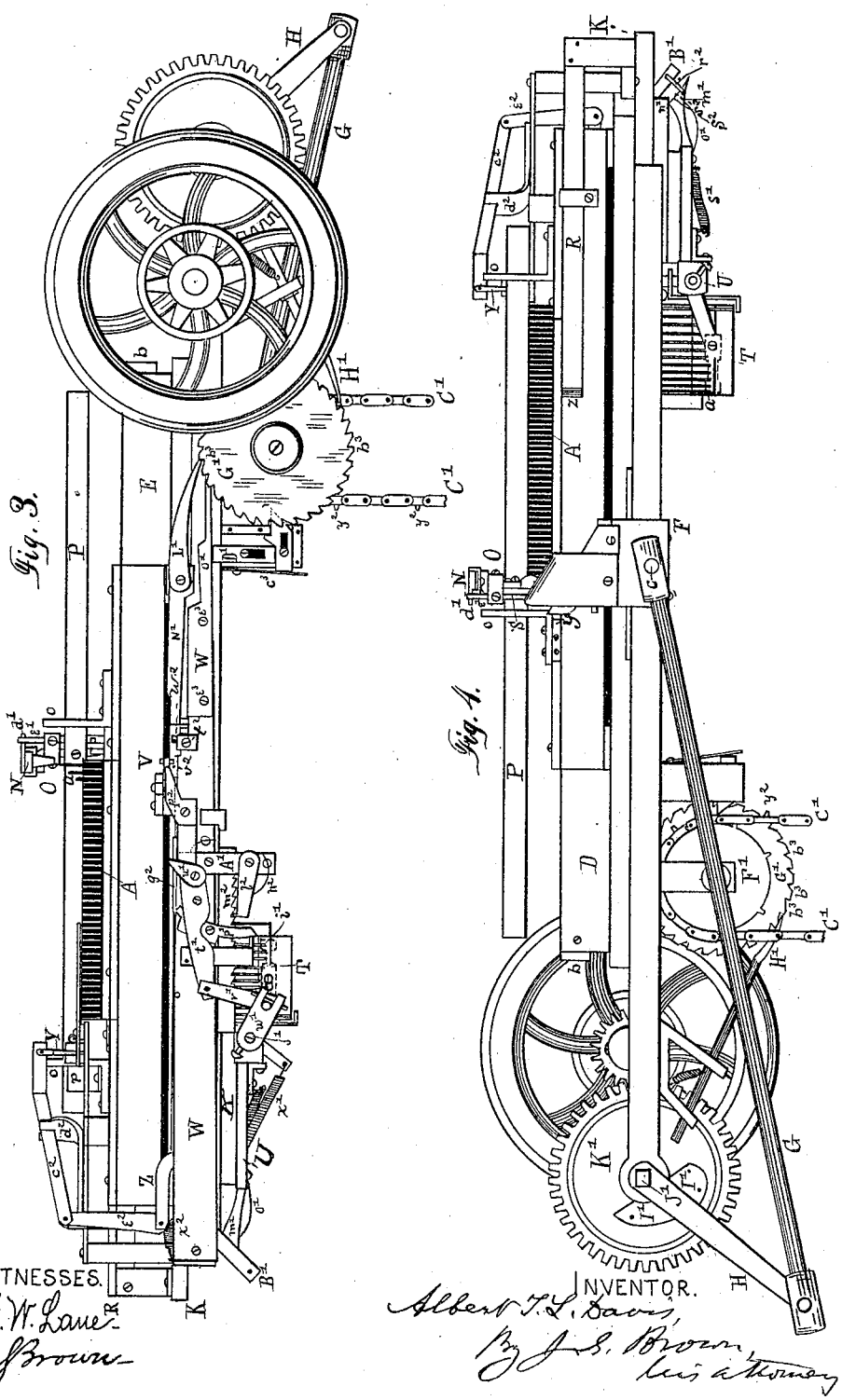

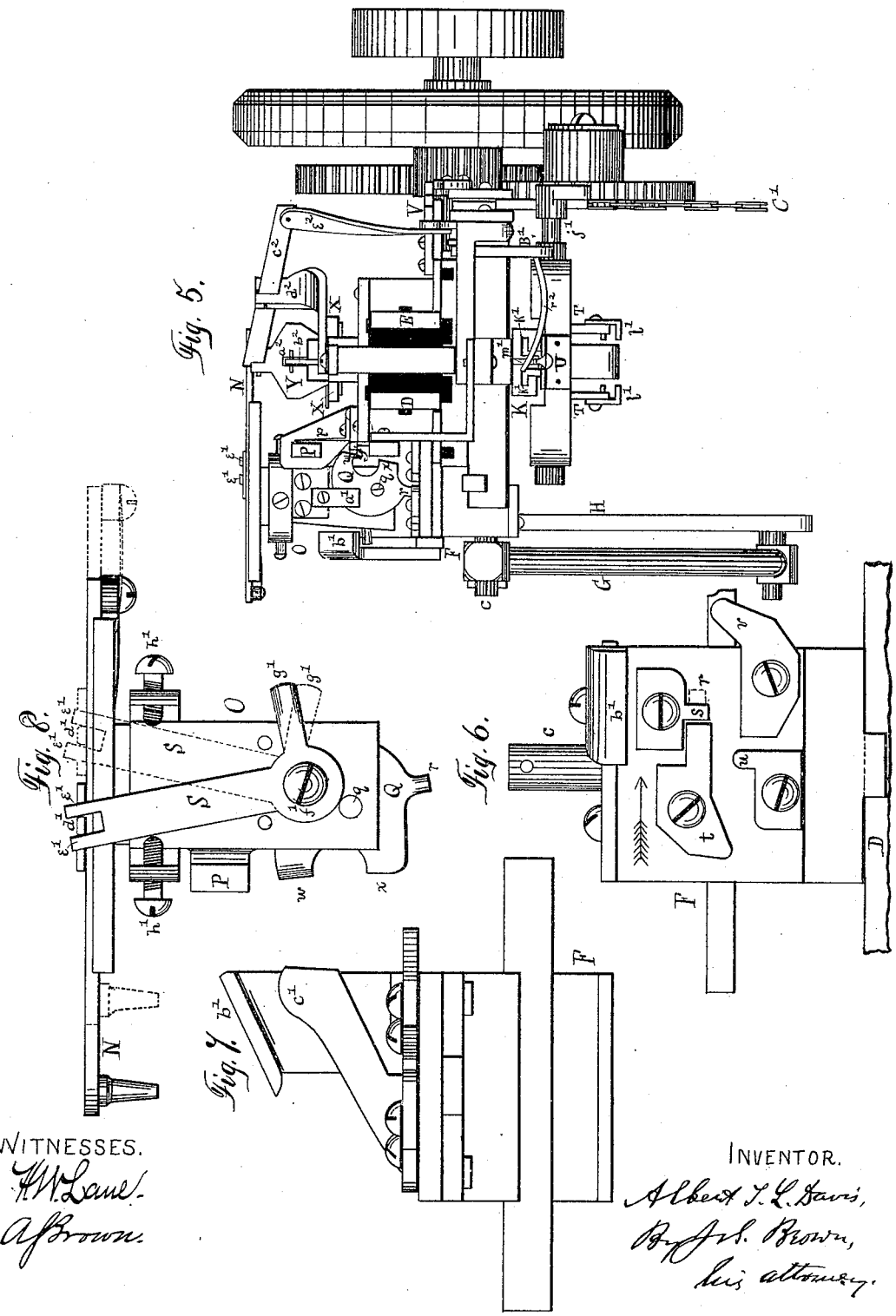

(Model.)
A. T. L. DAVIS.
KNITTING MACHINE.
No. 326,854. Patented Sept. 22, 1885.
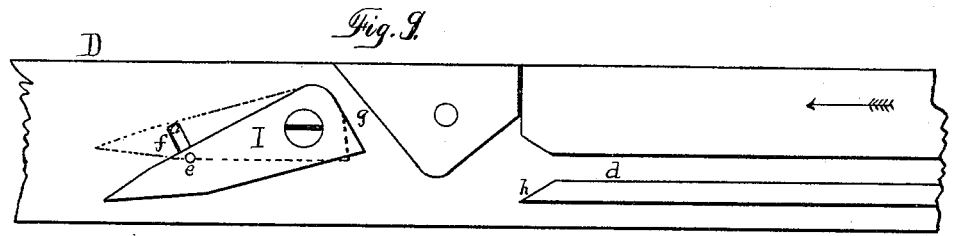
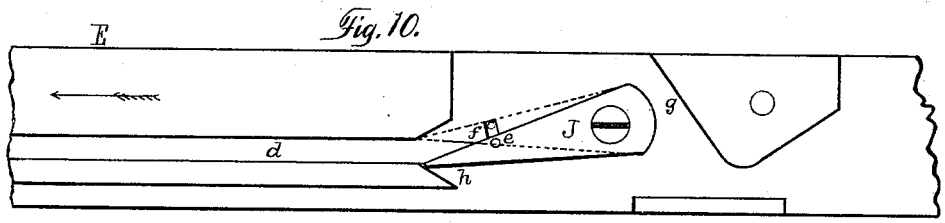
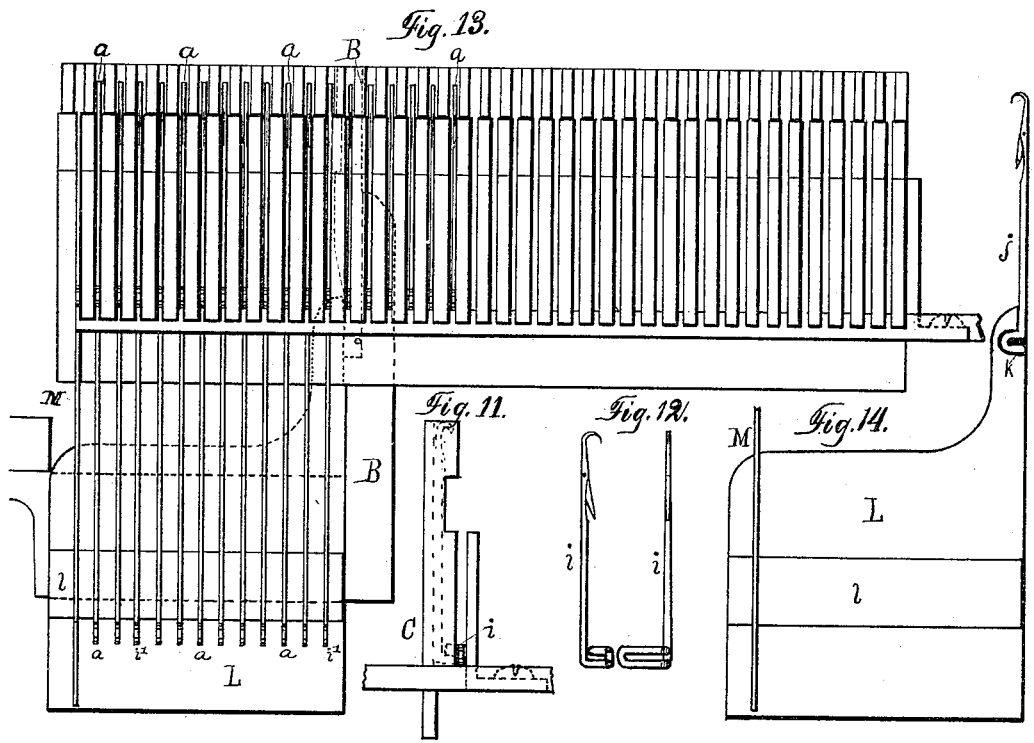
Witnesses.
F. W. Lane.
A. J. Brown.
Inventor.
Albert T. L. Davis,
By J. S. Brown,
his attorney.

(Model.) 10 Sheets—Sheet 5.
A. T. L. DAVIS.
KNITTING MACHINE.
No. 326,854. Patented Sept. 22, 1885.
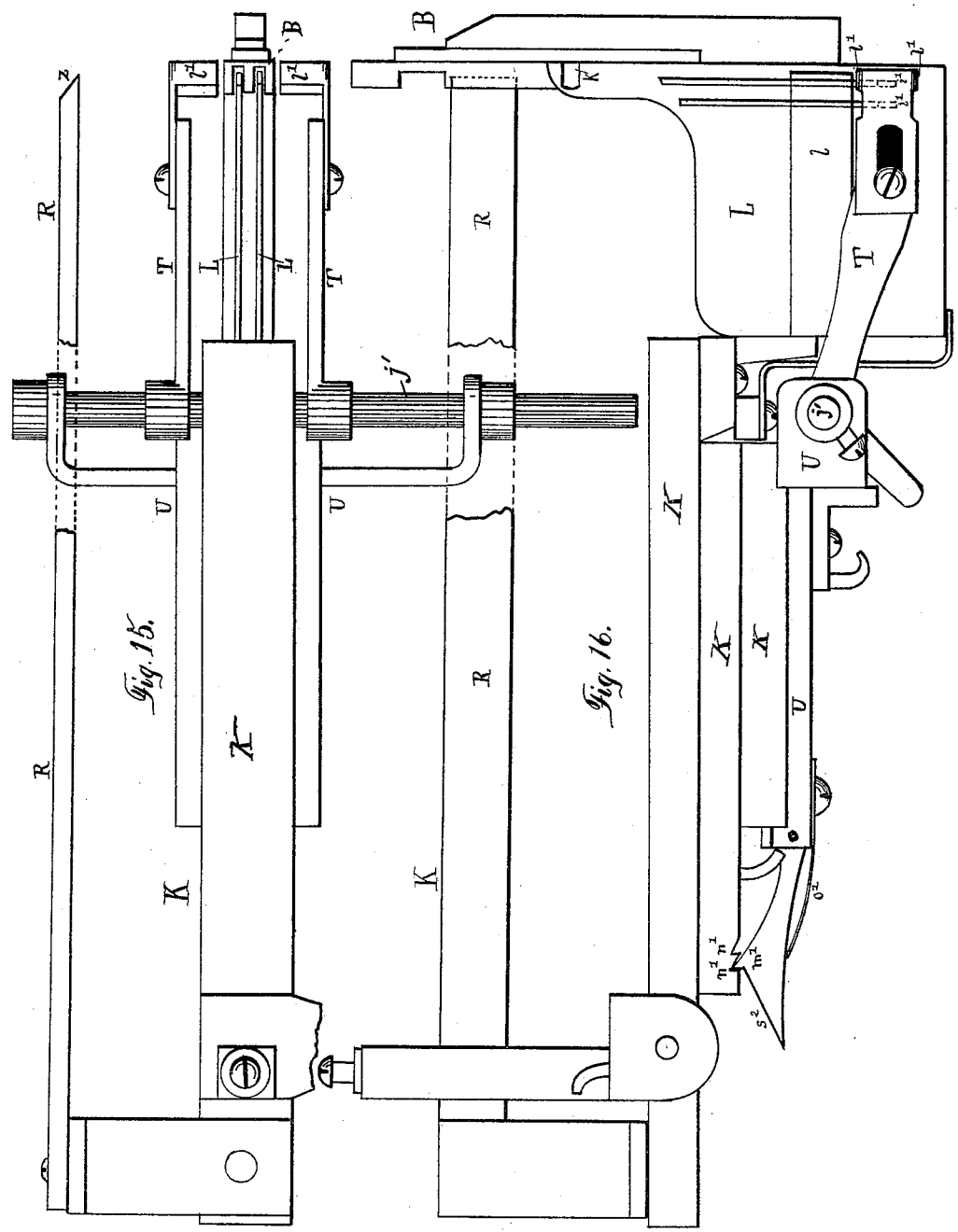
Witnesses.
Y. W. Lowe.
A. Brown
Inventor.
Albert T. L. Davis,
By J. S. Brown,
his attorney.

(Model.) A. T. L. DAVIS.
KNITTING MACHINE.
No. 326,854. Patented Sept. 22, 1885.
10 Sheets—Sheet 6.
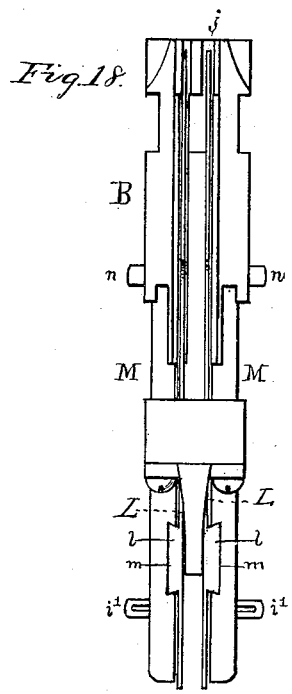
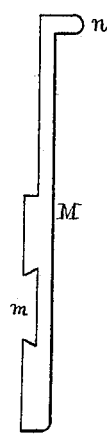
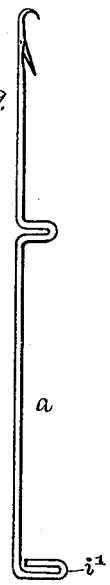
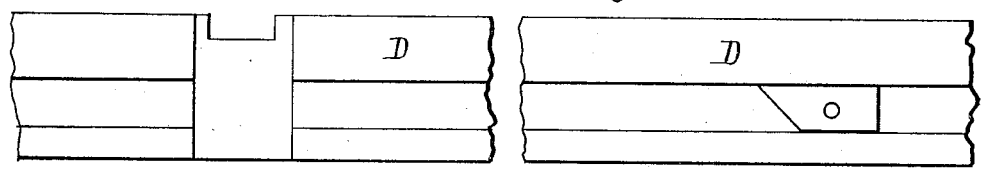
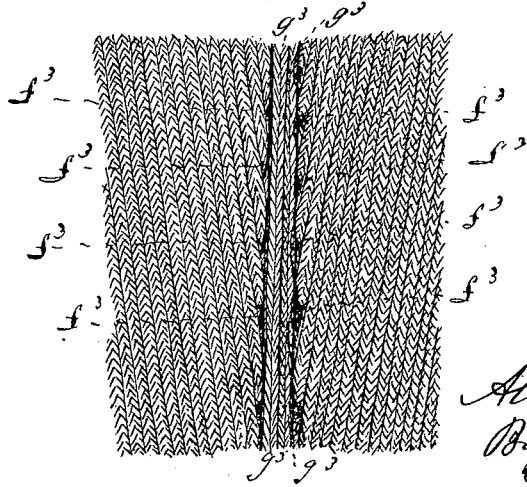
Witnesses.
Inventor.
Albert T. L. Davis,
By J. S. Brown,
his attorney.

(Model.)
A. T. L. DAVIS.
KNITTING MACHINE.
No. 326,854.  Patented Sept. 22, 1885.
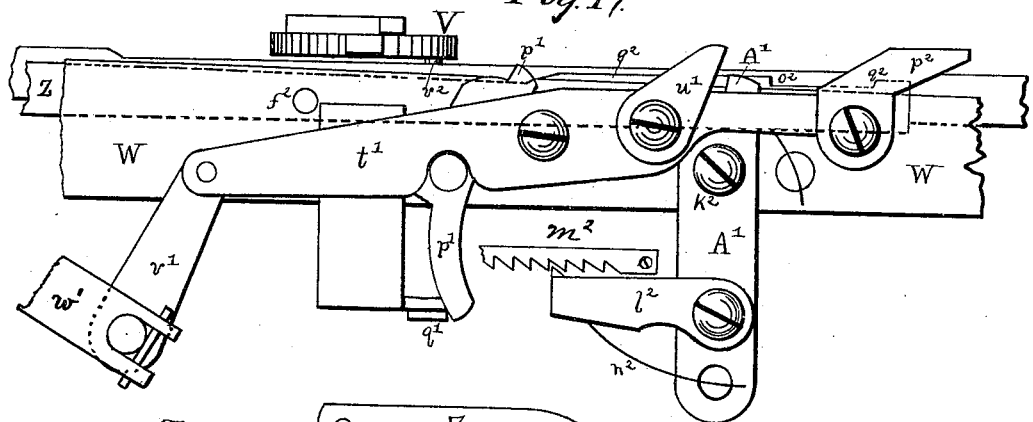
Fig. 19.
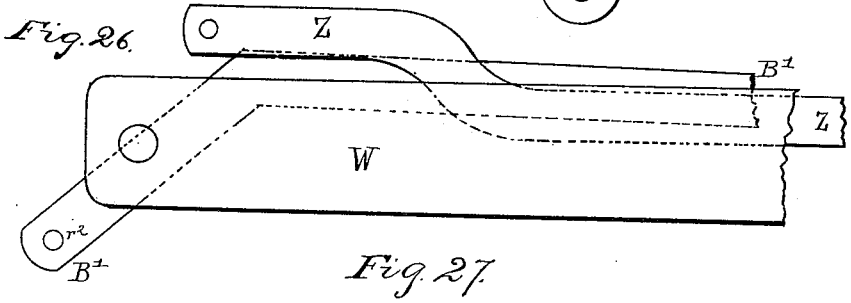
Fig. 26.
Fig. 27.
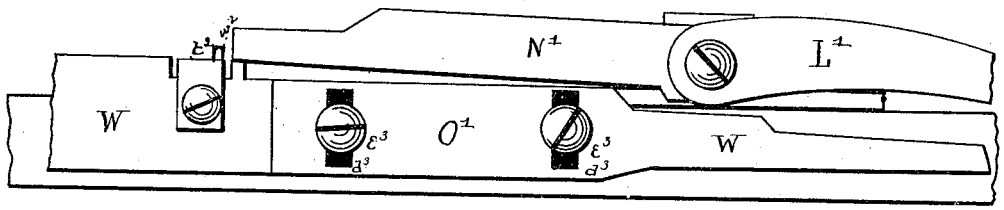
Fig. 20.
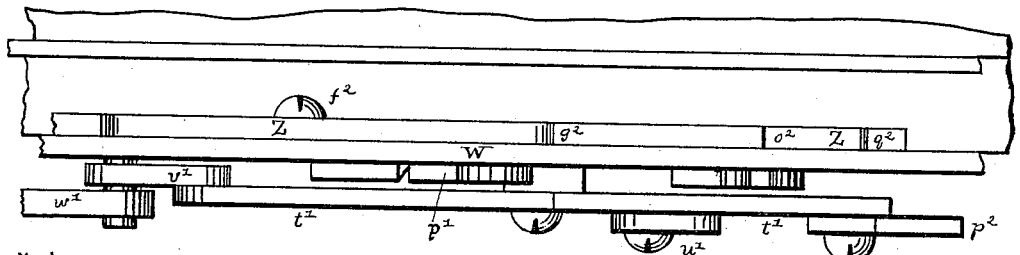
Witnesses.
Y. W. Lane.
A. J. Brown.
Inventor.
Albert T. L. Davis,
By J. S. Brown,
his attorney.
N. PETERS, Photo-Lithographer, Washington, D. C.

(Model.)
A. T. L. DAVIS.
KNITTING MACHINE.
No. 326,854. Patented Sept. 22, 1885.
10 Sheets—Sheet 8.
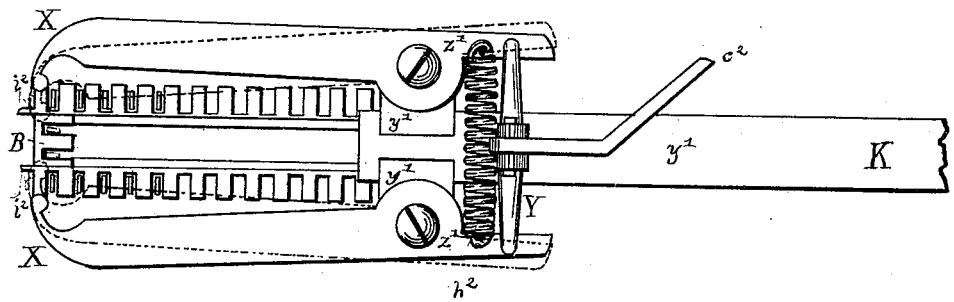
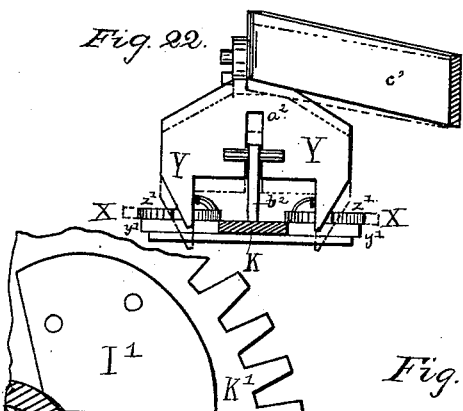
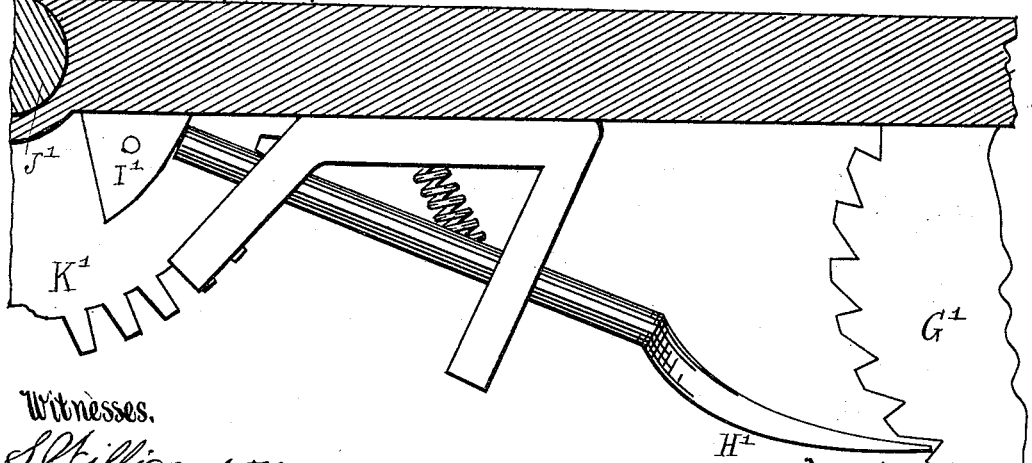
Witnesses.
S. Williamson
A. Brown
Inventor.
Albert T. L. Davis
By J. S. Brown,
his attorney (Model.)
A. T. L. DAVIS.
KNITTING MACHINE.
No. 326,854. Patented Sept. 22, 1885.
10 Sheets—Sheet 9.
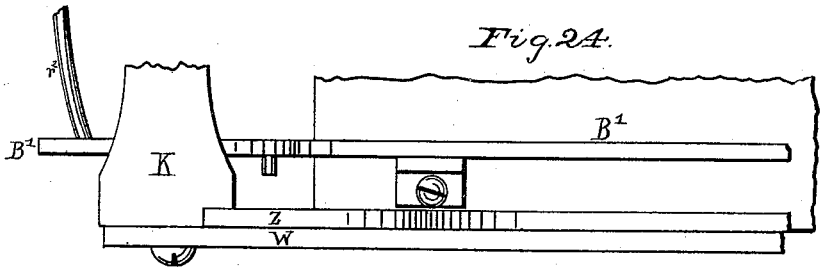
Fig. 24.
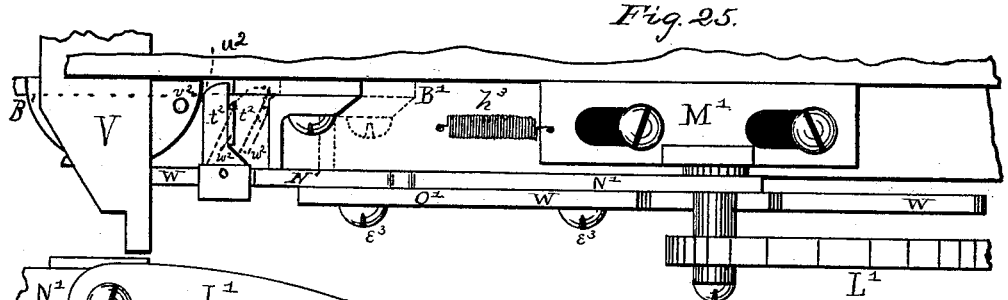
Fig. 25.
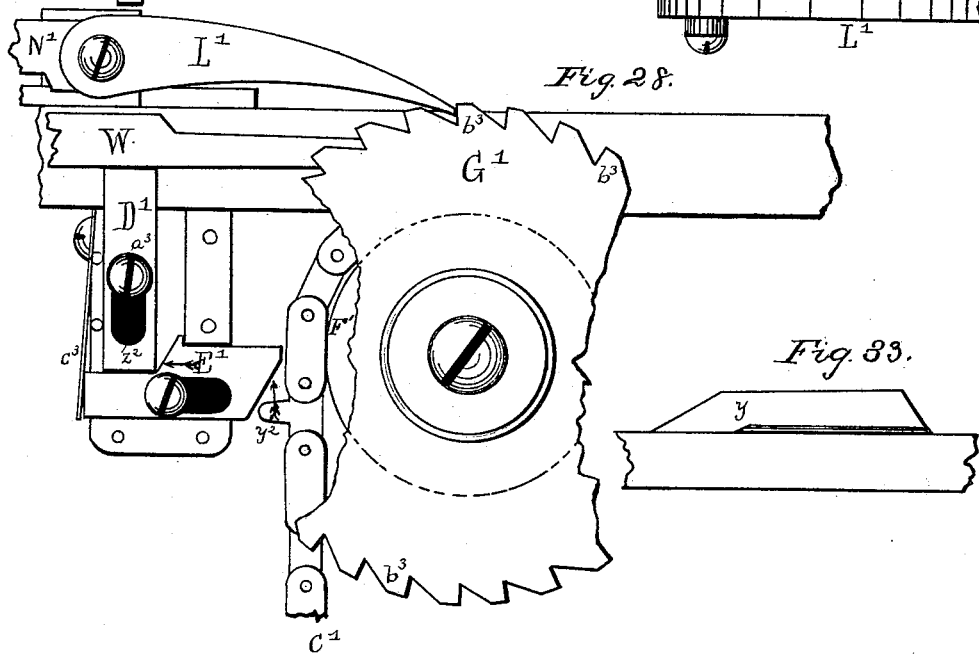
Fig. 28.
Fig. 33.
Fig. 31.
Witnesses.
F. W. Kane
A. Brown
Inventor.
Albert T. L. Davis,
By J. S. Brown,
his attorney.

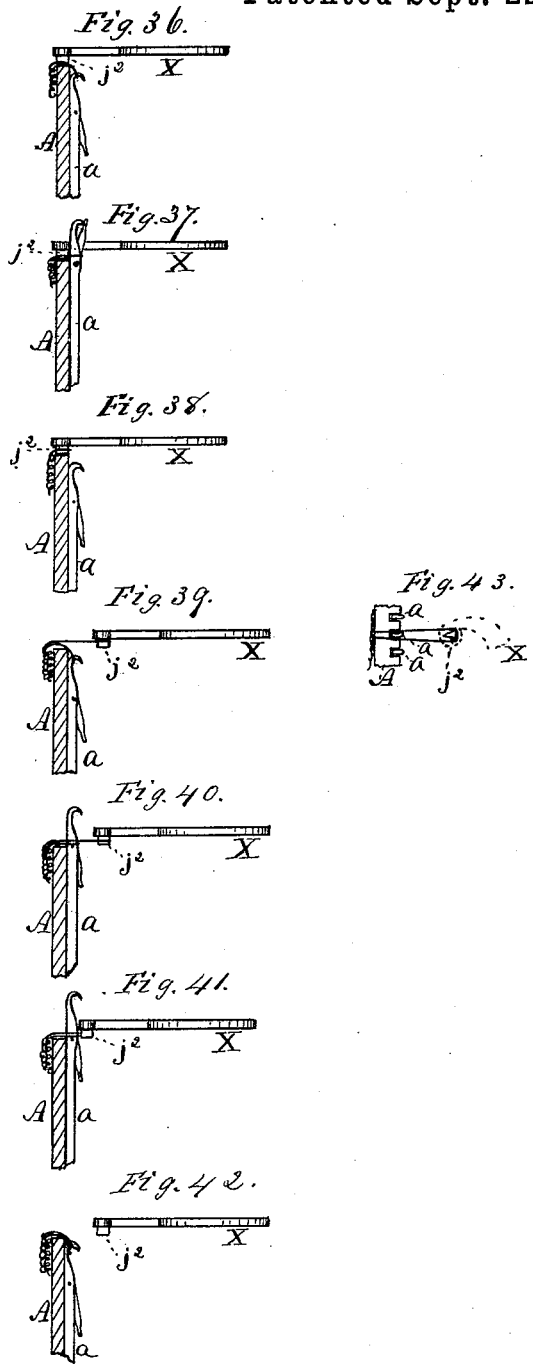

UNITED STATES PATENT OFFICE.

ALBERT T. L. DAVIS, OF LAKE VILLAGE, NEW HAMPSHIRE, ASSIGNOR OF ONE-HALF TO WILLIAM H. PEPPER, OF SAME PLACE.

KNITTING-MACHINE.

SPECIFICATION forming part of Letters Patent No. 326,854, dated September 22, 1885.

Application filed March 17, 1883. (Model.)

*To all whom it may concern:*

Be it known that I, ALBERT T. L. DAVIS, of Lake Village, in the county of Belknap and State of New Hampshire, have invented an Improved Knitting-Machine; and I do hereby declare that the following is a full and exact description thereof, reference being had to the accompanying drawings, making part of this specification—

Figure 1 being a top view of my improved knitting-machine; Fig. 2, an under side view thereof; Fig. 3, a front view of the same; Fig. 4, a rear view thereof; Fig. 5, an elevation of one end of the same; Figs. 6 and 7, respectively, a top view and side view of the part herein termed the "sliding cam-block," with its adjuncts; Fig. 8, a side view of the thread-guide and sliding carriage on which it is mounted; Figs. 9 and 10, respectively, side views of portions of the rear and front cam-bars for working the needles; Fig. 11, a side view of the stationary intermediate needle-bar herein described; Fig. 11', a top view of the same with the needles in place therein; Fig. 12, different views of the kind of needle used in the stationary intermediate needle-bar; Fig. 13, a side elevation, showing a portion of one of the side needle-bars, the movable intermediate needle-bar, and the specially-formed jacks and narrowing-needles used therewith for narrowing; Fig. 14, a side view of the jacks; Figs. 15 and 16, respectively, a top view and side view of the sliding bar or frame and its adjuncts, by which the intermediate sliding needle-bar is moved for narrowing; Fig. 17, a side view of one of the blank-bars whereby the up and down movements are communicated to the needles of the movable intermediate needle-bar by the cam-bars which give the same movements to the needles of the side needle-bars; Fig. 18, a rear or outer view of the movable intermediate needle-bar and parts attached thereto, together with an end view of the side needle-bars in proper position in relation thereto; Fig. 19, a side view of a part of the machine, on a larger scale, showing the tappet-arm, levers, and movable and dependent parts, whereby the narrowing movements are effected; Fig. 20, a top view of the same, except the tappet-arm; Fig. 21, a top view of the loop-carriers for narrowing, shown in position over the side needle-bars and intermediate movable needle-bar, showing also other parts connected with the parts mentioned; Fig. 22, a rear view of the said loop-carriers, and of the immediate operative mechanism thereof; Fig. 23, a front or inner end view of the loop-carriers; Fig. 24, a top view of one corner of the rear end of the machine, showing especially the sliding bar, whereby the detent which holds forward the traveling needle-lifting frame in narrowing is released to allow the return of the said frame to its rearward position; Fig. 25, a top view of a portion of the machine farther forward than the view in Fig. 24, showing the other end of the said sliding bar and the means for effecting its sliding movement; Fig. 26, a side view of the parts shown in Fig. 24; Fig. 27, a side view of a part of the machine, showing the forward end of the lever-bar by which the narrowing mechanism is operated, and the means by which the bar is brought into action by the pattern mechanism; Fig. 28, a side view of a part of the machine, showing the pattern mechanism and its connection with the narrowing lever-bar; Fig. 29, a side view of one of the double butt-needles used in narrowing; Fig. 30, a side view, partially in section, of a part of the machine, showing the cam on the driving-shaft, and pawl operated by the said cam for operating the pattern mechanism; Fig. 31, a side view of the tappet-arm by which the narrowing movement is effected; Fig. 32, a view of the under side, in part, of one of the loop-carriers; Fig. 33, a top view of a part of the machine, showing one of the fixed cams by which the thread-guide is shifted from over one side needle-bar to the other; Fig. 34, an outside elevation of one of the needle cam-bars; Fig. 35, a view of a portion of fabric made upon the machine, showing the manner in which the narrowing is effected; Figs. 36, 37, 38, 39, 40, 41, 42, and 43, views in detail, showing a portion of one of the side needle-bars with a needle therein, and a portion of one of the loop-carriers, illustrating the different steps of carrying a loop from one needle to another in narrowing; Fig. 43, a plan, corresponding to the view in Fig. 39, of the parts mentioned.

Like letters designate corresponding parts in all the figures.

The principal movements of my improved knitting-machine are like those of ordinary straight-knitting machines, while the work done thereby is tubular, like that of ordinary circular machines. My machine has also the capability of narrowing on one side, or in one line only, thereby producing a fabric or product especially valuable for stockings, or other goods preferably thus narrowed.

In the organization of the machine two straight needle-bars, A A, are employed, arranged parallel with each other, at a distance apart sufficient to admit the knit work passing down between them, and two narrow or sectional needle-bars, B C, each having two or more needles—two ordinarily being sufficient—between the said parallel needle-bars, for producing a properly-knit connection between the webs formed by the needles thereof, and thereby forming a tubular web. The two intermediate narrow needle-bars, B C, are of such proper width that the stitches formed at their junction with the parallel needle-bars A A will be of even length with the regularly-formed stitches. I make one of the intermediate needle-bars movable between the parallel needle-bars, from the edges toward the middle thereof and back, for the purpose of narrowing the work, while the other needle-bar, C, is stationary.

In connection with the two parallel needle-bars A A two cam-bars, D E, are used, sliding, respectively, outside of the said needle-bars, the needles $a$ $a$ of which slide in grooves in the needle-bars. These two cam-bars are connected together, as at $b$, near one end of each, so that both may move simultaneously and equally in each direction. By moving one, therefore, the other is moved also by the same means. The means shown consists of a sliding cam-block, F, (shown separately in Figs. 6 and 7,) attached to the rear cam-bar, D, and a connecting-rod or pitman, G, pivoted to a wrist-pin, $c$, on the cam-block at one end, while its other end receives the crank-pin of the driving-crank H on the driving-shaft J' at one end of the machine. The cams of these two cam-bars operate in the same way on the needles—that is, each lifts the needles to take the thread when the cam-bars are moving in one direction, and allows the needles to pass under the same and not work when the cam-bars are moving in the opposite direction or backward, and these two cams act alternately—that is, one cam works its needles in going one way and the other cam works its needles in going the other way, this movement being required in the organization of this machine. The two cam-bars require slightly-different arrangements of their cams, because of the different positions thereof relative to the needle-bars, since the two cams are nearly opposite to each other, and the heel of one cam is next to the needle-groove $d$ of its cam-bar, while the point of the other cam is next to the needle-groove $d$ of its cam-bar. This will be understood by reference to Figs. 9 and 10, the former representing a portion of the rear cam-bar, D, and the latter a portion of the front cam-bar, E. The cam I on the cam-bar D has its heel nearest to the head of the cam-groove $d$ going before, the arrows on the respective figures pointing in the same direction in the machine itself, but necessarily shown as pointing in opposite directions, since the views are opposite the same in working the needles, and the point of the cam J on the cam-bar E is nearest to the head of the needle-groove $d$, which holds the needles forward of the cam. Each cam is pivoted at its heel, and a pin, $e$, on each near its point, extending out through a slot, $f$, in the cam-bar, limits the upward and downward movement of the point of the cam. As each cam-bar goes forward, or in the direction to work the needles, the needles are raised upon the inclined top of the cam, and then are depressed through the passage-way $g$ to a position lower than the heel of the cam, so that when the cam-bar makes its return movement the cam will pass back over the heels of the needles, the point thereof being lifted to allow the needles to pass, as indicated by dotted lines in Figs. 9 and 10. The needles strike an inclined surface, $h$, as they enter each needle-groove $d$.

The use of the needle-grooves $d$ $d$ in the two cam-bars is to slightly raise the butts of the needles from their supports in the needle-bars, and hold them raised for picking on the work, and thus offer proper facility for inserting the stitches in the needle-hooks above the upper edges of the needle-bars, and for preventing the drawing up of the needles from their proper positions in the needle-bars during the said picking on, which is done in the usual manner. Since these cam-bars are opposite to each other, and the said cam-grooves are opposite to each other for the said purpose, and since the operating-cams of the cam-bars must be at adjacent ends of the cam-bars, so that as the knitting round is finished on one side of the work the knitting may be commenced on the other side close to the finished end of the round on the other side, it results that the said cams must be at the forward end of one cam-bar and at the rear end of the other cam-bar as they are respectively doing their work. The grooves $d$ $d$ in the cam-bars do not interfere with the operation of knitting.

When one of the intermediate needle-bars is stationary, as represented by C in the drawings, its needles $i$ $i$ are operated in the same way as the needles $a$ $a$ of the side or parallel needle-bars, A A, each having a long bend, as shown in Figs. 11 and 12, at right angles to the plane of its hook, forming a butt to reach the cam-bars, one reaching to one cam-bar and the other to the other cam-bar, so that these needles are operated in regular succession to the needles *a a*, as required. When the intermediate needle-bar is movable for the purpose of widening and narrowing, as represented by B in the drawings, a different and somewhat more complex construction is required for actuating its needles *j j*, as specially shown in Figs. 13, 14, 15, and 16. The needle-bar B is secured to a sliding bar or frame, K, so that it may pass along between the parallel needle-bars A A as far as necessary for the extent of narrowing required. In this frame are two (or one for each needle) broad jacks, L L, which have a vertical sliding movement in the frame K. The butt of each needle *j* takes into a notch, *k*, of the jack, whereby the needle is raised and lowered as the jack rises and falls, and each jack has a horizontal way or projection, *l*, which runs in a notch, *m*, of a blank-bar, M, Figs. 14 and 17, which slides up and down in a regular needle-groove (the extreme one) in each one of the parallel needle-bars A A, there being one of these blank-bars in each of said needle-bars, one for operating each jack. Each of these blank-bars M M has a projection or butt, *n*, to run in the needle-groove of the needle cam-bar, and to be actuated by the cam of the cam-bar just in the same way as the needles are actuated, so that the said blank-bars have the same movements imparted to them as the needles *a a* have; and since these blank-bars raise and lower their respective jacks L L therewith, it follows that the needles *j j* of the intermediate needle-bar B have also the same movements imparted to them as the other needles; and since, also, the blank-bars M M are located in regular succession to the needles *a a* in the parallel needle-bars A A, as represented, it follows that the said needles *j j* will be raised in regular succession to the needles *a a*, as required; and this takes place whatever may be the position of the needle-bar B in narrowing, since the ways *l l* of the jacks slide in the same blank-bars to an extent equal to the whole traveling movement of the said needle-bar in narrowing, the jacks L L being wide enough for that purpose; and all the intermediate needles from which stitches are removed in narrowing being dropped or removed out of action, the blank-bars M M are always the next to be operated after the last needle which holds a loop in knitting toward the narrowing needle-bar, and immediately precede in action the first needle holding a loop in the return movement. The cam-bars in this organization continue to move the full length of the parallel needle-bars, so as to act on the blank-bars M M, whether the machine is narrowing or not. The thread or yarn guide N, however, only travels as far as the actual working-needles of the parallel bars A A extend—that is, it travels the full length of the said needle-bars when all the needles thereof work; but as the traveling intermediate needle-bar B moves inward in narrowing the thread-guide is caused to stop opposite thereto, so as to pass accurately over the same at each round in knitting. At the end where one intermediate bar C is stationary it constantly stops at each round or reciprocation opposite to the same.

The mechanism by which these movements and the entire operation of the thread-guide are effected is shown in the main views of the drawings, and in the detail views, Figs. 6, 7, and 8. The thread-guide is mounted on a carriage, O, attached to a longitudinal bar, P, which slides in suitable ways, *o o*, of the main frame of the machine. This bar carrying the thread-guide carriage is free to be moved one way or the other, and is held from accidentally moving out of any position in which it is left by the movements of the machine by a simple friction-brake, *p*, or its equivalent. The carriage O is alternately moved in opposite directions, and left in the positions required by means of a swinging coupling-bar, Q, on the said carriage, and of stops and cams on the traveling cam-block F, which impart the motion to the thread-guide carriage and cams on other parts of the machine, all constructed, arranged, and operating substantially as follows: The said coupling-bar is pivoted to the carriage O at *q*, Figs. 5 and 8, so as to swing or oscillate at right angles to the forward and backward movements of the carriage itself. A projecting heel, *r*, on the lower end of the coupling-bar engages with stops and cams on the cam-block F, as shown in Fig. 6. The engaging-heel passes in a way over the said cam-block between a stop, *s*, and a cam, *t*, on one side, and a stop, *u*, and a cam, *v*, on the other side of the said way or passage, formed and arranged substantially as shown. The coupling-bar Q also has two projections, *w* and *x*, the upper projection, *w*, being arranged to strike a fixed cam, *y*, on the main frame of the machine, as seen in Figs. 1, 4, and 5, and the lower projection, *x*, being arranged to strike a cam, *z*, on the end of a bar, R, Figs. 14 and 15, on the sliding frame K, the position of the cam therefore depending on the position of the intermediate needle-bar B mounted thereon.

With this construction of mechanism the following explanation of the successive movements and actions of the several parts will give a proper understanding of the operation of the thread-guide carriage. Suppose, first, that the cam-block F is moving in the direction, as indicated by the arrow in Fig. 6, toward the end where the stationary needle-bar C is located, in proper relation to which the fixed cam *y* is situated. The heel *r* of the coupling-bar Q then bears against the stop *s*, which thereby moves the thread-guide carriage along with the cam-block. When the said carriage nearly reaches the position where it should stop, the upper projection, *w*, of the coupling-bar strikes the fixed cam *y*, which swings the coupling-bar far enough to disengage the heel *r* from the stop *s*, leaving the carriage in proper position, when the cam-block goes on without further moving the said carriage. In this continued movement of the cam-block the cam $t$ next strikes the heel $r$, and still further swings the coupling-bar aside, and to that extent that when the cam-block begins to make its return or reverse movement the stop $u$ then engages the heel and moves the thread-guide carriage in the other direction. Then when the said carriage is about to reach the position where for the time the movable needle-bar R requires it to stop, the projection $x$ on the coupling-bar Q encounters the cam $z$ on the movable bar R, which thereby swings the said coupling-bar in the direction opposite to the swinging motion given to it by the cam $y$ sufficient to disengage the heel $r$ from the stop $u$, leaving the carriage in the position required, while the cam-block, as before, continues to move on. In this continued movement the heel $r$ strikes the cam $v$, which swings the coupling-bar still further in the same direction, far enough to cause the heel $r$ in the next reverse movement to engage with the stop $s$, as first set forth. Thus the complete forward and backward movement of the thread-guide carriage is effected, and it is left in every case just where it is required to be until the thread is carried over the proper needle-bars B C. The coupling-bar Q is held in its various positions without liability to accidental disarrangement by a brake-spring, $a'$, pressing against it, as shown in Fig. 5, or by other equivalent means.

The movements of the thread-guide N, are so directed that it shall traverse necessarily over one needle-bar A, then across over an intermediate needle-bar B, then over the other needle-bar A, then back over the other intermediate needle-bar C. I have before described the means for moving the thread-guide forward and backward over the respective needle-bars A A. The lateral movements thereof over the intermediate needle-bars B C are effected by the action of two cams, $b'$ and $c'$, also attached to the traveling cam-block F, as fully shown in Figs. 6 and 7. For this purpose the thread-guide has a lateral sliding movement in ways on the top of the carriage O just sufficient to move it from its proper position over one needle-bar A to its proper position over the other needle-bar A, the extent of the movement being indicated by full and dotted lines in Fig. 8, which shows clearly this part of the mechanism. A lateral coupling projection, $d'$, on the bar of the thread-guide, engages in a slot or fork, $e'$, of an actuating-lever, S, which is pivoted at $f'$ to the carriage O. The lever is preferably of right-angled or bell-crank form, so that a vertical movement of the horizontally-projecting arm $g'$ thereof will cause the required horizontal movement of the thread-guide. The projecting-arm $g'$ engages with the cams $b'$ $c'$ on the cam-block F, the relative positions of the parts being shown in Figs. 1, and 4. These cams formed on a vertically-projecting standard on the cam-block F, are arranged so that one cam, $b'$, Figs. 6, and 7, will depress the arm $g'$ of the lever, and thereby throw the thread-guide into the position shown by dotted lines in Fig. 8, and the cam $C'$ will raise the said lever-arm, and thereby throw the thread-guide back into the position shown by full lines in the same figure. The cams are so arranged that they will move the thread-guide in the proper direction over the needle-bars B C, and at the proper time. They are also so arranged on the cam-block that they do not act on the thread-guide till the thread-guide carrier has been moved to the right position and the heel of the coupling-bar has been freed from the stops $s\ u$. Then the cam-block begins to move without the carriage, and the cams $b'\ c'$ begin to act on the lever S, the one by depressing and the other by raising the arm $g'$ of the lever as the cam-block is moved in one direction or the other. The movements of the said lever are limited in both directions by set-screws $h'\ h'$, which consequently determine the exact position of the thread-guide.

Various ways of applying narrowing mechanism to the knitting organization above described, and to make it automatic, may be employed. I represent in the drawings a mechanism for this purpose, peculiar in several respects, which I will now proceed to describe. This mechanism is shown as narrowing at one side of the work only in connection with the traveling needle-bar B. First, a certain number of the needles $a\ a$ in the parallel needle-bars A A, at the end where the movable needle-bar B slides between the said parallel needle-bars, as many as it is required ever to take the loops from in narrowing, are extended down below their needle-bars, and are provided each with another butt, $i'$, as shown in Figs. 3, 13, 18, and 29. These extensions and butts of the said needles are for the purpose of applying a special device for raising the needles one by one to cast off and take loops for narrowing, this device being entirely distinct from and unconnected with the cam-bars. This needle-lifting device consists of two arms, T T, Figs. 15 and 16, attached to a rock-shaft, $j'$, which is mounted in a light frame, U, having a limited sliding movement in the under part of the sliding frame K, that carries the movable needle-bar B and its appendages by means of suitable ways $k'\ k'$, Fig. 5. On the end of each arm T are two fingers, $l'\ l'$, turned inward from the arm, so as to embrace (or come) one above and the other below the butt $i'$ of any one of the narrowing needles on that side of the machine. The fingers are only wide enough to act upon one needle at at time. The rock-shaft $j'$ is to have a rocking movement sufficient to lift the needles as far as required to carry the loops over their latches and cast the same off when they are again brought down to a normal position. The whole frame U, on which the arms and their rock-shafts are mounted, has an extent of sliding movement in the frame K sufficient to move each finger $l'$ from one needle to the next needle in order. At the back end of the frame U is a pawl or detent, $m'$, pivoted thereto to take into two holding-notches, $n'\ n'$, in a bar or part of the frame K, as shown in Fig. 16. A spring, $o'$, presses the detent into the notches. A movement of the detent from one notch to the other corresponds with a movement of the fingers $l'\ l'$ from one needle to the adjacent needle. For the purpose of narrowing, the first movement is to move the arms T T, with their fingers $l'\ l'$, forward from one needle on each side to the next needle, which, by proper arrangement, is always to be the first needle in each side or parallel needle-bar, A, which for the time being is opposite to the movable needle-bar B, and therefore the first in the side bar which carries a loop. At the beginning of the narrowing this is the first needle in each needle-bar A, and as the narrowing proceeds a needle on each side is dropped out of the work, the lifting-fingers $l'\ l'$ traveling inward as fast as the needles are deprived of their loops.

The forward and up and down movements of the arms T T, as above indicated, as well as other movements of the narrowing mechanism, are effected by means of a tappet-arm, V, attached to the front cam-bar, E, and traveling with it, the said tappet-arm acting on levers, which, through connecting rods or bars, effect the desired result in the manner now to be described. The levers on which the tappet-arms act are mounted on a bar, W, Figs. 1, 3, 19, and 20, extending along the front side of the machine and connected at one end with the sliding frame K and moving forward with it. The tappet-arm travels closely over this bar, and the levers immediately moved by the arm are pivoted to the bar. The first is a lever, $p'$, pivoted to the vertical face of the said bar W, and having its upper end reaching but a little above the upper edges of the bar, so that the tappet-arm will move it only a short distance before it will by its turning descend below the upper edge of the bar and free itself from the tappet, which is then permitted to travel on. The lever acts upon the outer arm of another lever, $q'$, pivoted to a projecting arm on the under side or edge of the bar W, the arm of the lever $q'$ being connected by a rod, $r'$, with the frame U, and thereby giving the forward movement to the said frame for engaging the fingers $l'\ l'$ with the butts of the next narrowing-needles in order, the detent $m'$ catching into its forward notch to retain the frame in its advanced position. The return or backward movement of the frame U to compensate for the last forward movement of the frame K, on which the said frame U is mounted when the detent is released, is effected by a counter-spring, $s'$. The next lever, $t'$, which turns the rock-shaft $j'$ for raising the arms T T, is also pivoted to the front vertical side of the bar W, and lies in a nearly-horizontal position, a cam projection, $u'$, on its upper end projecting a little above the upper edge of the said bar and forming there an inclined surface upon which the tappet-arm rides to depress that arm of the bar. The other arm of the lever is connected by a shackle-link, $v'$, with an arm, $w'$, projecting from the rock-shaft $j'$, and thereby turns the rock-shaft sufficiently to lift the arms T T thereon as far as required. The return movement of the rock-shaft and arms is effected by a counter-spring, $x'$.

Next, in connection with the lifting movements of the needles for narrowing, I employ a pair of loop-carriers or carrying-points, X X, for the purpose of taking the loops from the loop-discarding needles, as above described, and carrying the same to the next needles in order, which needles are raised by the same means as the discarding-needles to receive the loops from these loop-carriers. The loop-carriers are shown detached in Figs. 21, 22, 23, and 32, and their arrangement on the machine is shown in Figs. 1 and 5. They are pivoted to a bar, $y'$, attached to the frame K, and sliding therewith, so that they move from needle to needle in the parallel needle-bars A A as the narrowing proceeds. Their pivot movements are such that they move inward over the needle-bars A A in position to receive the loops from one pair of discarding-needles, (one in each needle-bar,) and then carry the loops to the next pair of needles which receive the loops, and then move outward again, to be out of the way of the needles and to spread the loops to receive the needles. These inward and outward movements are effected by the mechanism shown, as follows: Between the rear arms, $z'\ z'$, of the loop-carriers a vertically-moving cam, Y, is caused to descend, for moving the loop-carriers inward, by simply separating the said rear arms; and since both loop-carriers should move simultaneously and equally inward at all times, the cam is guided centrally between the said arms by means of a vertical notch or slot, $a^2$, therein, embracing a fixed vertical guide, $b^2$, as seen in Fig. 22, or by equivalent means, so that the cam shall not swerve out of position and shall bring both loop-carriers inward to the same extent every time without fail. The cam Y is mounted on a lever, $c^2$, which is pivoted to a standard, $d^2$, on the bar $y'$, so as to move up and down as required. The other end of the lever $c^2$ is connected by a connecting-rod, $e^2$, with the rear end of a cam-lever, Z, which lies along by the side of and is pivoted at $f^2$ to the bar W, as seen most clearly in Figs. 1, 3, 19, and 20. This cam-lever has a cam-surface, $g^2$, projecting higher than the upper edge of the bar W, for the tappet-arm V to strike for depressing that end of the lever, lifting the rear end of the same, and, through the connecting-rod $e^2$, lifting also the outer end of the lever $c^2$, and consequently depressing the cam Y, for moving the loop-carriers X X inward in position for taking or delivering loops from and to the needles in narrowing. The reverse movement of all the parts is effected by a spring, $h^2$, acting to draw the rear arms of the loop-carriers toward each other, or any equivalent means. Each loop-carrier has a form substantially as shown in Fig. 32, being somewhat curved, the needles rising in the inner bend of the curve, while the end $i^2$, which is somewhat enlarged, has attached to its lower side a downwardly-projecting point, $j^2$, of wedge form, as shown in Figs. 23 and 32, for holding the loop when the loop-carrier is moved outward. The loop-carriers are brought into position before the loop-discarding needles are raised, and therefore the cam projection $u'$, by which the fingers $l'\,l'$ are lifted to raise the needles, is struck by the tappet-arm V after the cam-surface $g^2$ is struck thereby. After the tappet-arm passes beyond the cam-projection $u'$, and consequently the loop-discarding needles have descended and cast off their loops, the whole frame K and all parts connected therewith are moved forward to the extent of the distance from one needle $a$ to the next in order. This movement therefore moves the needle-bar B forward to a position between the next side needles in order, and also the fingers $l'\,l'$ to the corresponding needles, ready to lift them for receiving the loops discarded by the preceding needles. This forward movement of the frame K and its appendages is also effected by the tappet-arm V, acting on a lever, A', pivoted to the bar W at $k^2$. To the lower arm of this lever is pivoted a pawl, $l^2$, which extends back and takes into one of a set of ratchet-teeth, or fixed ratchet-bar $m^2$, on the main frame of the machine, being pressed to the ratchet-bar by a spring, $n^2$. The forward movement of the tappet-arm V, acting against the upper end of the lever A', while the pawl $l^2$ holds in one of the ratchet-teeth, pushes forward the bar W, and consequently draws along the whole frame K, to which the said bar is attached, and all the parts mounted on or connected with the said frame. The lever A' is so proportioned in the length of its arms as, and projects just far enough above the bar W, to allow it to descend below the upper edge of the bar and become freed from the tappet-arm, when the frame and its appendages have moved the required distance, as above stated. It is returned to position after the passage of the tappet-arm over it by its own weight, or by a counter-spring. After the moving forward of the frame K and the parts carried or moved thereby, the tappet-arm V arrives at a depression, $o^2$, in the cam-surface $g^2$, so that the loop-carriers are allowed to move outward somewhat by the action of the spring $h^2$, Fig. 21, to properly form and open the loops for the needles, by giving them the necessary length therefor. Next, the tappet-arm strikes a second cam-projection, $P^2$, on the finger-lifting lever $t'$, and thereby raises the needles which are to receive the loops from the loop-carriers, the loops having been formed and placed in position to receive them by the loop-carrier points, and held open by the loop-carriers being carried outward sufficiently for the purpose, the wedge shape of the points spreading the loops for the reception of the needles. The tappet V then strikes the cam-surface $g^2$ and swings the loop-carriers partly inward again, so as to set free the loops and allow the needles to take them. The receiving-needles are not raised high enough to carry their first loop below the latches, but sufficient to receive the additional loops from the loop-carriers, and therefore hold the two loops till the next round is knit.

The movements of the loop-carriers X X, in connection with the needles $a\,a$ in the parallel needle-bars A A, all produced by the means hereinbefore described, operate to narrow the fabric in the following manner, reference being specially made to the detail views given in Figs. 36, 37, 38, 39, 40, 41, 42, which show, respectively, a partial cross-section of one of the needle-bars with one of the needles in place, and the end of one the of loop-carriers in various positions in relation of the needle-bar and needle, and in Fig. 43, which shows a fractional top view corresponding to the section in Fig. 39, a fraction of the knit fabric on the inside of the needle-bar is shown with the loops being operated on by the needles, and loop-carrier shown extended outward over the needle-bar to the proper positions. These detail views indicate the operation of one loop-carrier and one set of needles only, it being understood that the other opposite loop-carrier operates at the same time with the other set of needles to narrow on the other side of the fabric. In Fig. 36 the loop-carrier X is shown as moved inward over the needle bar A, this movement of the loop-carrier being effected by the cam-surface $g^2$ of the cam-lever Z, as before specified. In this position of the co-operative parts the adjacent double-butt needle $a$ of the needle-bar is sunk in its groove and holds the loop to be taken therefrom by the loop-carrier and transferred to the next needle, and the downwardly-projecting wedge-shaped point $j^2$ of the loop-carrier rests in the opening of the said loop just over the upper edge of the needle-bar A. Then, while the loop-carrier X is retained in this position, the needle $a$ is raised by the special action of the needle-lifting arm T, as before described, high enough to cast off the loop, and is again lowered to cast off the loop. In Fig. 37 I show the needle in its descent ready to cast off the loop over its latch, and in Fig. 38 the needle as returned to its lowest position and the loop cast off therefrom and caught by the projection $j^2$ of the loop-carrier. Next, the whole frame K, with its dependent frame U, is carried forward, by means heretofore described, far enough to bring the loop-carrier X, with the said loop thereon, directly over the next needle $a$, and to bring the fingers $l'\,l'$ of the needle-lifting arm T in line with the lower butt of the said second needle, and during or at the close of this movement the loop-carrier X is moved outward a little by the tappet-arm V arriving at the depression $o^2$ in the cam-surface, hereinbefore described, for spreading the loop over the second needle. The positions of the operative parts then are shown in Figs. 39 and 43. Then the second needle is raised by the arm T, as before mentioned, far enough to take the loop held by the loop-carrier, but not far enough to carry its own loop down beyond its latch, as indicated in Fig. 40. Then, again, the loop-carrier is moved by the cam-surface $q^2$, as before set forth, partly, just sufficient to release the loop held by its point $j^2$ and leave it on the needle, all as indicated in Fig. 41. Finally, the needle is returned again to its lowest position, as shown in Fig. 42, holding both loops, ready for the next round of knitting in the ordinary way.

To complete the arrangement of the mechanism ready for a repetition of the narrowing movement on the next succeeding needles, the frame U, carrying the needle-lifting arm T T, has to be moved backward to the extent of the distance between two adjacent needles, otherwise the next regular forward movement of the frame K would carry the lifting-fingers to the second needles in order, instead of the first. This return of the frame U to the extent of one notch $n'$, and the means by which it is accomplished, are hereinafter specified.

By the means thus far described one narrowing operation is completed, and these movements are all carried on while a regular course of knitting is progressing, without interfering with the same, and thus no time lost in narrowing. There remains to be effected the release of the detent $m'$, to allow the return of the frame U, to compensate for the forward movement of the frame K, on which the said frame U is mounted. For this purpose a sliding bar, B', (shown enlarged in Figs. 24 and 25,) is arranged in a position substantially as shown in Fig. 1, so that it may be moved by the tappet-arm V. The bar is provided with a lateral arm, $r^2$, which is so arranged as to strike a cam-surface, $s^2$, on the upper side of the detent $m'$, so that by moving forward the bar B' the said detent is struck by the arm $r^2$, and consequently is depressed and disengaged from its ratchet-tooth, thereby allowing the return of the said frame U. The construction of the detent $m'$ for this purpose is clearly shown in Fig. 16, and the arrangement of the arm $r^2$, in connection with the said detent, is clearly seen in Figs. 2 and 4. To give a forward motion to the bar B', for this purpose an arm, $t^2$, is pivoted to the bar W, and reaches laterally into a notch or depression, $u^2$, in the said bar B', so as to bear against a shoulder at the forward end of the said depression. A projection, $v^2$, Figs. 25 and 31, on the lower side of the tappet-arm, is arranged to strike the arm $t^2$, or an upward projection, $w^2$, thereon, and thereby push the arm B' forward, as indicated by dotted lines in Fig. 25. As the free end of the arm $t^2$ is swung forward in this movement the tappet projection $v^2$ moves past the end of the arm projection $w^2$, when the detent $m'$ has been disengaged from its ratchet-tooth thereby, and moves on without further action on the bar B'. The end of the projection $w^2$ may be slightly rounded, as shown, to facilitate the passing by the end thereof, and consequently the setting free, of the projection $v^2$. The return movement of the bar B' is effected by means of a counter-spring, $x^2$, and this also swings the arm $t^2$ back into position.

To render the whole narrowing movement automatic I connect therewith a Jacquard mechanism. I have represented a Jacquard chain, C', provided with studs $y^2 y^2$ upon its links at the requisite intervals to bring the narrowing mechanism into action at the proper time. The bar W, on which the various levers and cams are mounted, which are worked by the tappet-arm V in narrowing, is the instrument employed in connection with the Jacquard mechanism for effecting the purpose. The bar is movable up and down a sufficient distance to bring all its levers and cams into engagement with the tappet-arm V when the bar is raised, and to disengage them all when the bar is lowered. All that is required, therefore, to make the engagement and disengagement automatic is to provide for lifting the bar W by the studs $y^2 y^2$ of the Jacquard chain, and to allow the bar to drop when each of the said studs passes on. To this end the free forward end of the bar W rests upon a vertically-sliding support, D', which is guided and held by means of a slot, $z^2$, in the bar-support, and a screw or bolt, $a^3$, secured in the slot. This bar-support is raised by a horizontally-sliding cam, E'. (Shown most clearly in Fig. 28.) Against the other end of this cam the studs $y^2$ on the Jacquard chain act so as to push the cam under the bar-support and lift the bar W. By this movement the support D' is raised and held upon the top of the cam E' until the stud $y^2$ of the Jacquard chain passes up beyond the said cam. The Jacquard is, as usual, mounted on a sprocket-wheel, F', and a ratchet-wheel, G', on the same shaft, is moved by a sliding pawl, H', actuated by a cam, I', on the driving-shaft J', or, as shown, upon a cog-wheel, K', through which the motion is communicated to the driving-shaft.

When the bar W has been raised by the action of one of the studs $y^2$ of the Jacquard chain, it is held thus until the ratchet-wheel G' is moved forward to the extent of one of its notches or teeth $b^3 b^3$, when the stud $y^2$ will be moved beyond the cam E', and will allow the cam to be sprung forward by the action of a counter-spring, $c^3$, and thereby permit the bar-support D' to descend, and with it the bar W, by which the narrowing mechanism is thrown out of action. Now, since the narrowing, as above set forth, is carried on while the machine is knitting a course of stitches on one line of needles, the narrowing mechanism is to be disengaged before the Jacquard chain can be moved by the cam I' turning with the driving-shaft J'. I therefore cause the camdisengaging movement of the Jacquard to be effected by the tappet-arm V after it has effected the narrowing movements, and, in fact, just at the close of its reciprocating movement in the direction in which it is then moving. The means employed for this purpose consists of a pawl, L', pivoted to a sliding bar, M', and taking into one of the teeth $b^3$ $b^3$ of the ratchet-wheel G'. An arm, N', is also pivoted to the sliding bar M', and reaches backward to a position where the tappet-arm V will strike its rear end just before the completion of the said tappet-arm's forward movement. It will therefore be pushed forward by the tappet-arm, and in turn it will push forward the sliding bar M' and pawl L' sufficient to move the ratchet-wheel G' one notch, and thereby set the cam E' free and lower the bar W, and with it all then engaging cams and levers of the narrowing mechanism. The tappet-arm V then, in its backward movement, passes over all these parts without touching them, including the disengaging-arm $t^2$, and the pivoted arm N', resting on the bar W, is also lowered out of reach of the said tappet-arm. The return movement of the sliding bar M' is effected by a spring, $h^3$, Figs. 1 and 25. The knitting then goes on with only the proper knitting mechanism in operation until another stud on the Jacquard chain acts on the cam E and brings the narrowing mechanism into action.

Any number of courses may be knit, of course, between the narrowing courses.

The forward end, O', of the bar W is a separate piece, and is connected with the main bar by vertical slots $d^3$ $d^3$ therein and screws or bolts $e^3$ $e^3$. By this means the height of the bar W is accurately adjustable to suit the work.

The arm N' is again raised to a position to be again struck by the tappet-arm V, by the extension O' of the bar W striking it near its pivot, when the said bar is again raised, as indicated in Fig. 27.

It will be seen that the narrowing takes place with two stitches at a time in two rows by means of the needles $a$ $a$ in the parallel needle-bars A A, leaving two stitches formed by the needles in the intermediate needle-bars B C between the narrowing stitches, or as many stitches as there are needles in the said needle-bar. The fabric thus produced is like that represented in Fig. 35. This produces the fabric represented in Fig. 25, which represents a portion of a circular-knit web where the narrowing is effected. The two rows $f^3$ $f^3$ of narrowing stitches have two rows, $g^3$ $g^3$, of regular stitches between them.

What I claim as my invention is—

1. The combination of two parallel needle-bars, A A, two reciprocating cam-bars, D E, arranged, respectively, by the side of the said needle-bars, two intermediate needle-bars, B C, sets of latch-needles in the said needle-bars, and intermediate mechanism for actuating the needles of the said intermediate needle-bars by the said cam-bars, substantially as and for the purpose herein specified.

2. The combination of two parallel needle-bars, A A, two intermediate needle-bars, B C, one being movable, the needles, two cam-bars, D E, jacks L L, and blanks M M, connecting the cam bars and the needles of the movable needle-bar, and a narrowing mechanism, substantially as and for the purpose herein specified.

3. The combination of the movable needle-bar B, sliding frame K, reciprocating frame U, jacks L L, and mechanism for operating the said jacks, substantially as and for the purpose herein set forth.

4. The combination of the movable needle-bar B, needles $j$ $j$, sliding frame K, reciprocating frame U, jacks L L, blank-bars M M, cam-bars D E, and mechanism for operating the said cam-bars, substantially as and for the purpose herein set forth.

5. The combination of the thread-guide N, sliding carriage O, traveling cam-block F, coupling-bar Q, and means for vibrating the said coupling-bar, substantially as and for the purpose herein specified.

6. The combination of the sliding thread-guide carriage O, coupling-bar Q, means for vibrating the said coupling-bar, and cam-block F, provided with stops $s$ $u$ and cams $t$ $v$, substantially as and for the purpose herein set forth.

7. The combination of the sliding thread-guide carriage O, coupling-bar Q, and means for vibrating the said coupling-bar, cam-block F, stops $s$ $u$ and cams $t$ $v$ on the said cam-block, cam $y$, the cam-bar R, and sliding frame K, substantially as and for the purpose herein specified.

8. The combination of the thread-guide N, the sliding thread-guide carriage O, vibrating lever S, and cam-block F, provided with cams $b'$ $c'$, substantially as and for the purpose herein specified.

9. Narrowing-needles $a$ $a$, provided with downward extensions and additional butts $i'$ $i'$ thereon, in combination with a special needle-lifting device, T T, and mechanism for actuating the said needle-lifting device, substantially as and for the purpose herein set forth.

10. The combination of the oscillating arms T T, reciprocating frame U, provided with fingers $l'$ $l'$, and the narrowing-needles $a$ $a$, provided with butts $i'$ $i'$, substantially as and for the purpose herein set forth.

11. The reciprocating frame U, the needle-lifting arms T T, in combination with the sliding frame K, the movable needle-bar B, and mechanism for communicating an intermittent forward movement to the said sliding frame, substantially as herein set forth.

12. The combination of a vertically-movable bar, W, provided with levers and cams $p'$ $t'$ $u'$ $p^2$ A', and vibrating cam-lever Z, substantially as described, means for raising the said bar to bring the said parts into action, a tappet-arm, V, and reciprocating cam-bar E, which carries the said tappet-arm, substantially as and for the purpose herein set forth.

13. The combination of the frame U, provided with the detent $m'$, sliding frame K, provided with the notches $n'$ $n'$, reciprocating and intermediate mechanism $p'$ $q'$ $r'$, tappet-arm V, and reciprocating cam-bar E, substantially as and for the purpose herein specified.

14. The combination of the oscillating arms T T, rock-shaft $j'$, reciprocating tappet-arm V, lever $t'$, and spring $x'$, substantially as and for the purpose herein specified.

15. Loop-carriers X X, mechanism for actuating the same, and the sliding frame K, mechanism for communicating an intermittent forward movement to the said frame, in combination with the narrowing-needles $a$ $a$, mechanism for operating the said needles, and the parallel needle-bars A A, substantially as and for the purpose herein specified.

16. The combination of the loop-carriers X X, the frame K, mechanism for communicating an intermittent forward movement to the said frame, the narrowing-needles $a$ $a$, mechanism for operating the said needles, movable bar B, and mechanism for actuating the loop-carriers, substantially as and for the purpose herein specified.

17. The combination of the laterally-reciprocating loop-carriers X X, cam Y, cam-lever Z, connecting rod and lever between the said cam and cam-lever, the bar W, and the reciprocating cam-bar E, and tappet-arm V, substantially as and for the purpose herein specified.

18. The combination of the sliding frame K, lever A', reciprocating cam-bar E, tappet-arm V, pawl $l^2$, and main frame having fixed ratchet-teeth $m^2$, substantially as and for the purpose herein set forth.

19. The combination of the reciprocating frame U, having a detent $m'$, sliding frame K, having holding-notches $n'$ $n'$, sliding bar B', provided with an arm, $t^2$, as described, and reciprocating cam-bar E, and tappet-arm V, substantially as and for the purpose herein specified.

20. The combination of the reciprocating cam-bar E, tappet-arm V, vertically-movable bar W, provided with engaging-levers and cams $p'$ $t'$ $u'$ $p^2$ A' Z, and spring $c^3$, as described, and pattern mechanism for raising the said bar with its said parts in action, substantially as and for the purpose herein set forth.

21. The combination of the reciprocating cam-bar E, tappet-arm V, vertically-movable bar W, provided with engaging-levers and cams $p'$ $t'$ $u'$ $p^2$ A' Z, and spring $c^3$, pattern-chain C', and connecting mechanism D' E', for raising the said bar and its said parts into action, and means L' M' N' for permitting the lowering of the bar and its parts out of action, substantially as and for the purpose herein specified.

22. The combination of the reciprocating cam-bar E, tappet-arm V, vertically-movable bar W, provided with engaging-levers and cams $p'$ $t'$ $u'$ $p^2$ A' Z, and spring $c^3$, pattern-chain C', support D', cam E', pawl L', sliding bar M', and pivoted arm N', substantially as and for the purpose herein specified.

23. The combination of the pattern-chain C', ratchet-wheel G', pawl L', sliding frame M', pivoted arm N', reciprocating cam-bar E, and tappet-arm V, substantially as and for the purpose herein specified.

In testimony whereof I have signed my name in presence of two witnesses.

ALBERT T. L. DAVIS.

Witnesses:
S. C. CLARK,
THOS. HAM.